July 15, 1952 W. S. PATTERSON 2,603,559
GAS AND STEAM GENERATOR FOR SYSTEMS FOR OBTAINING FUEL
GASES AND OTHER PRODUCTS FROM NATURAL GAS AND THE LIKE
Filed June 23, 1948 5 Sheets-Sheet 1

Inventor
W. S. Patterson
Attorneys

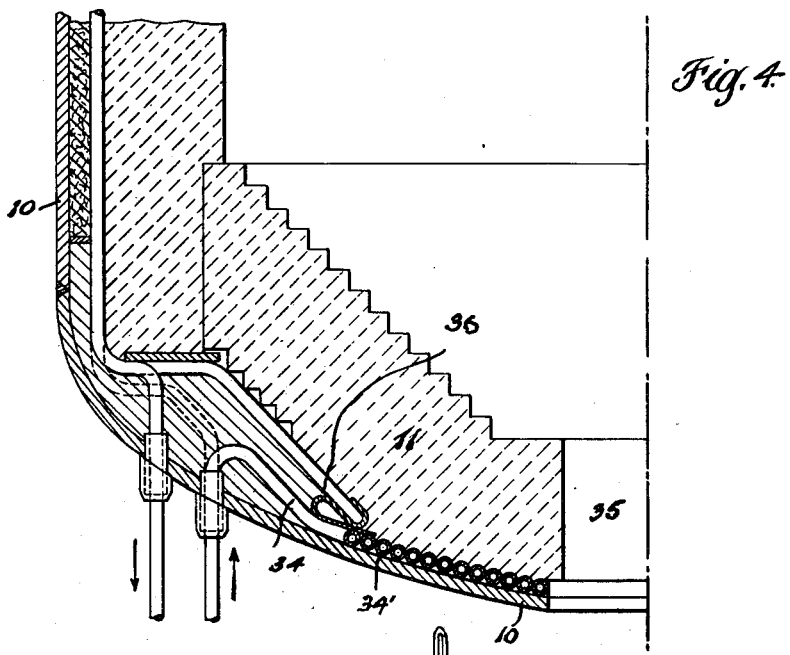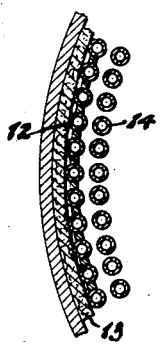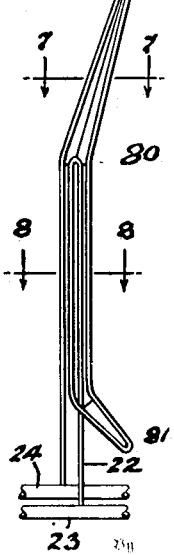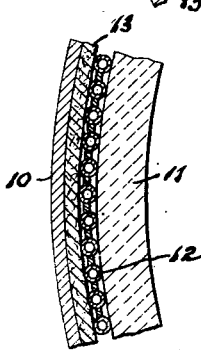

July 15, 1952 W. S. PATTERSON 2,603,559
GAS AND STEAM GENERATOR FOR SYSTEMS FOR OBTAINING FUEL
GASES AND OTHER PRODUCTS FROM NATURAL GAS AND THE LIKE
Filed June 23, 1948 5 Sheets-Sheet 5

Inventor
W. S. Patterson

By
Attorneys

Patented July 15, 1952

2,603,559

UNITED STATES PATENT OFFICE 2,603,559

GAS AND STEAM GENERATOR FOR SYSTEMS FOR OBTAINING FUEL GASES AND OTHER PRODUCTS FROM NATURAL GAS AND THE LIKE

Ward S. Patterson, Chappaqua, N. Y., assignor, by mesne assignments, to Combustion Engineering-Superheater, Inc., a corporation of Delaware Application June 23, 1948, Serial No. 34,678

10 Claims. (Cl. 48—196)

This invention relates to a combined gas and steam generator for use in systems for the converting of fuels into other forms of fuels, and by-products thereof, and similar systems.

In the synthesis of such other fuels, and by-products thereof, the starting fuel may be a gas, such as natural gas, or a solid fuel, such as coal and the like. The first step of the process is to convert the starting fuel in a generator to form what is commonly known as the "synthesis" gas which in turn is broken down by catalysis in a reactor to form the desired products such as ethane, and high octane gasoline components, such as octene, hereinafter referred to as gasoline, and by-products such as ethyl alcohol, and fuel, such as Diesel oil.

Where the starting fuel is natural gas, this gas is preheated to a relatively high temperature, usually to approximately 1200° F., and is introduced into the generator under superatmospheric pressure, usually in the neighborhood of 265 to about 300 p. s. i. As the oxidant or supporter of combustion, oxygen is desirably employed and is introduced into the natural gas to be burned in the generator in an amount insufficient to support complete combustion, i. e., in an amount to maintain a reducing atmosphere. The oxygen usually of about 95% to 99% purity is also introduced at substantially the same pressure at which the generator is operated and likewise it is preheated say to 600° F. In the case of a solid fuel such as coal, for example, the coal is pulverized and introduced into the generator as are also steam and oxygen. The pulverized coal is introduced with any suitable conveying medium such as, for example, steam or oxygen both of which substantially react with the coal, or some inert gas such as carbon dioxide or nitrogen.

In both cases, the "synthesis" gas generated in the generator consists largely of carbon monoxide and hydrogen which are ultimately converted to various hydrocarbons by catalysis in the reactor which follows the generator.

Steam is used not only as a reactant to provide oxygen and release hydrogen in the generator, but to a large extent also in the operation of auxiliaries such as pumps, compressors and fans.

One of the primary objects of the invention is to provide a simple generator, suitable for large scale commercial operation, for effectively generating the synthesis gas and also steam for use in the system.

Another object of the invention is to provide a generator which is capable of withstanding the severe operating conditions. In addition to the conditions already mentioned, the temperature in the furnace portion of the regenerator is of a very high order, usually about 2500° F. The high temperature gas leaving the furnace portion proper must be cooled before it may be led through the metal pipes, which ultimately conduct the gas to the reactor.

Still another object of the invention is to provide a generator which, while gas and pressure-tight, may nevertheless be readily inspected and repaired.

How the foregoing, together with such other objects and advantages as are incident to the invention or may hereinafter appear, are realized is illustrated in the accompanying drawings, wherein—

Fig. 2 is an enlarged section taken on the line 2—2 of Fig. 1;

Fig. 3 is an enlarged section taken on the line 3—3 of Fig. 1;

Fig. 4 is an enlarged fragmentary section through a portion of the furnace proper of the regenerator;

Fig. 5 is a view illustrating one of the tube units employed as part of the wall of the generator;

Figure 1:
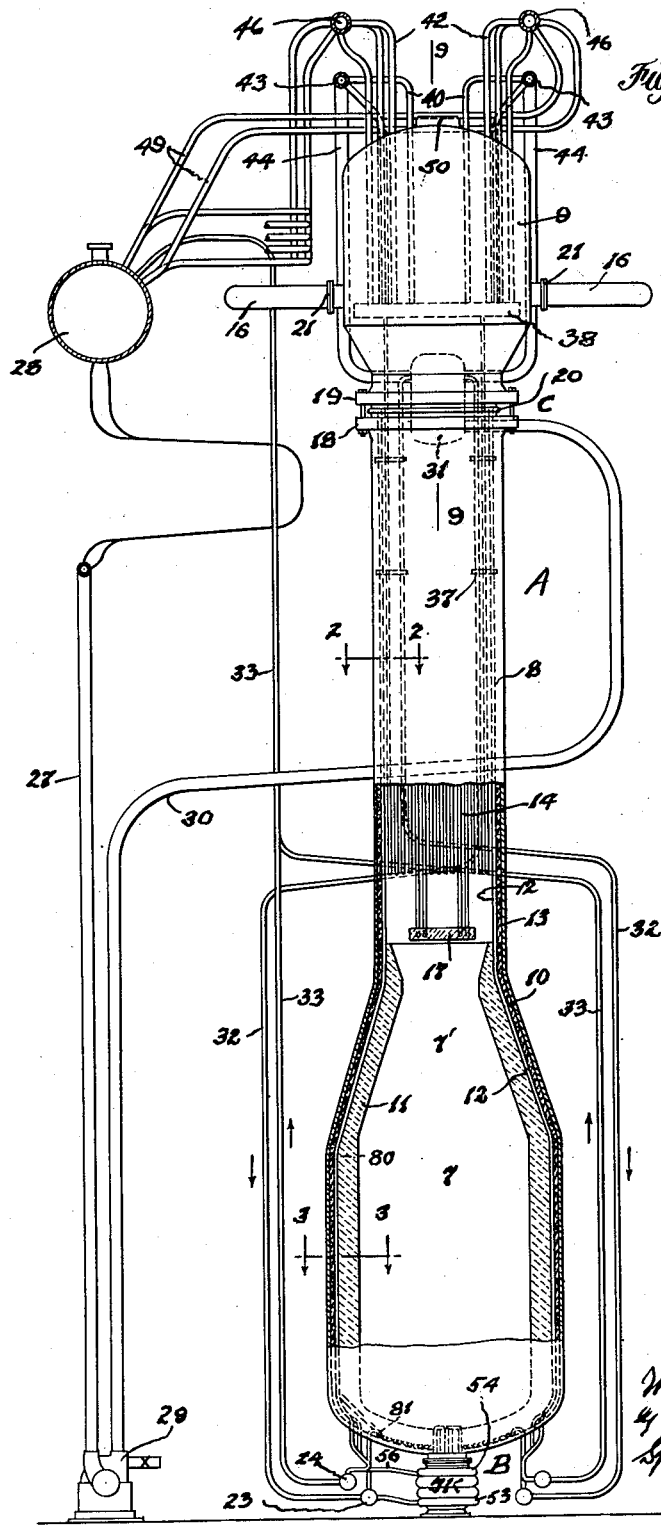
Fig. 1 is a more or less diagrammatic side elevation and partial section through a gas and steam generator embodying my invention.
Figure 9:
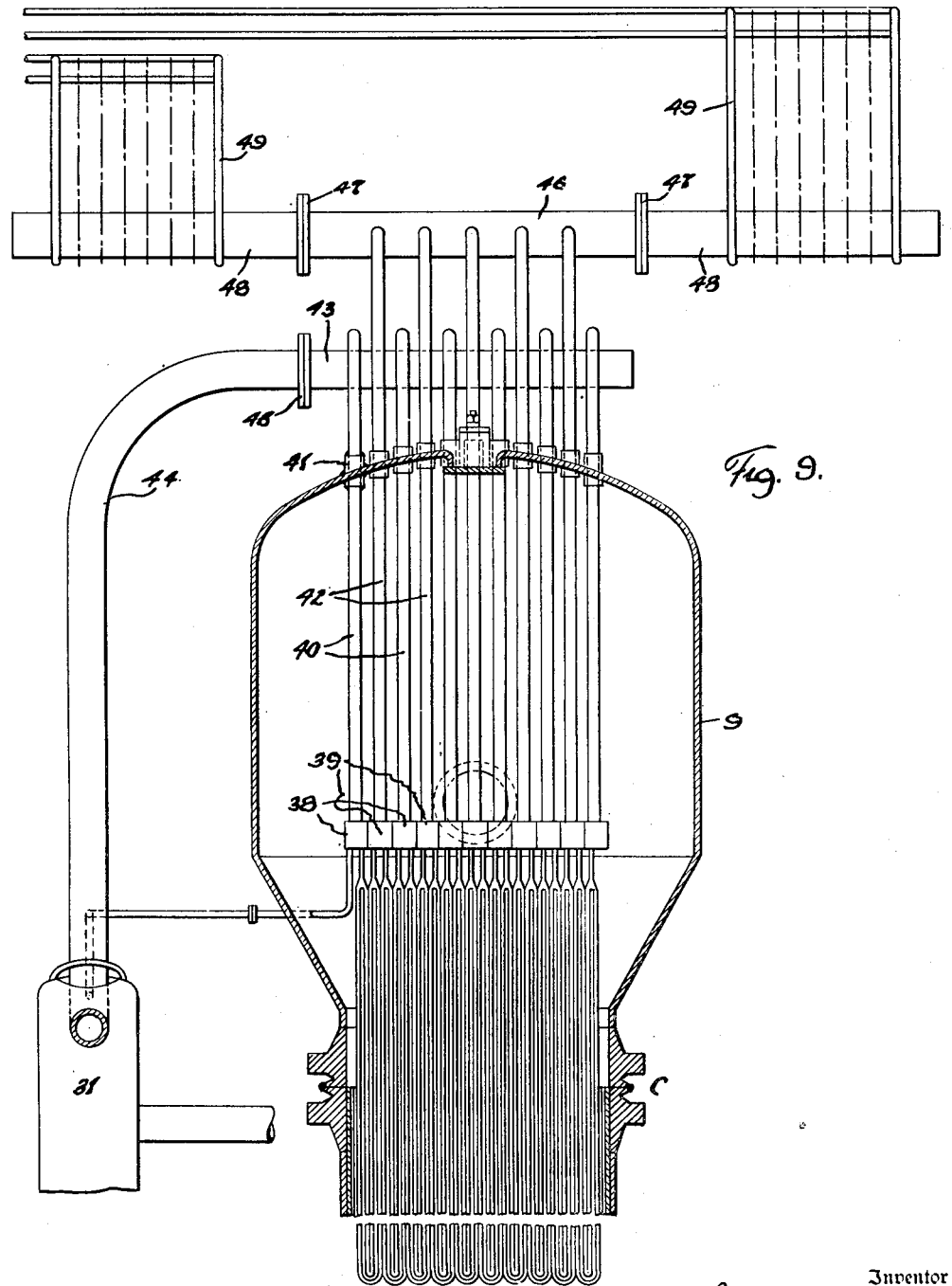
Figure 10:
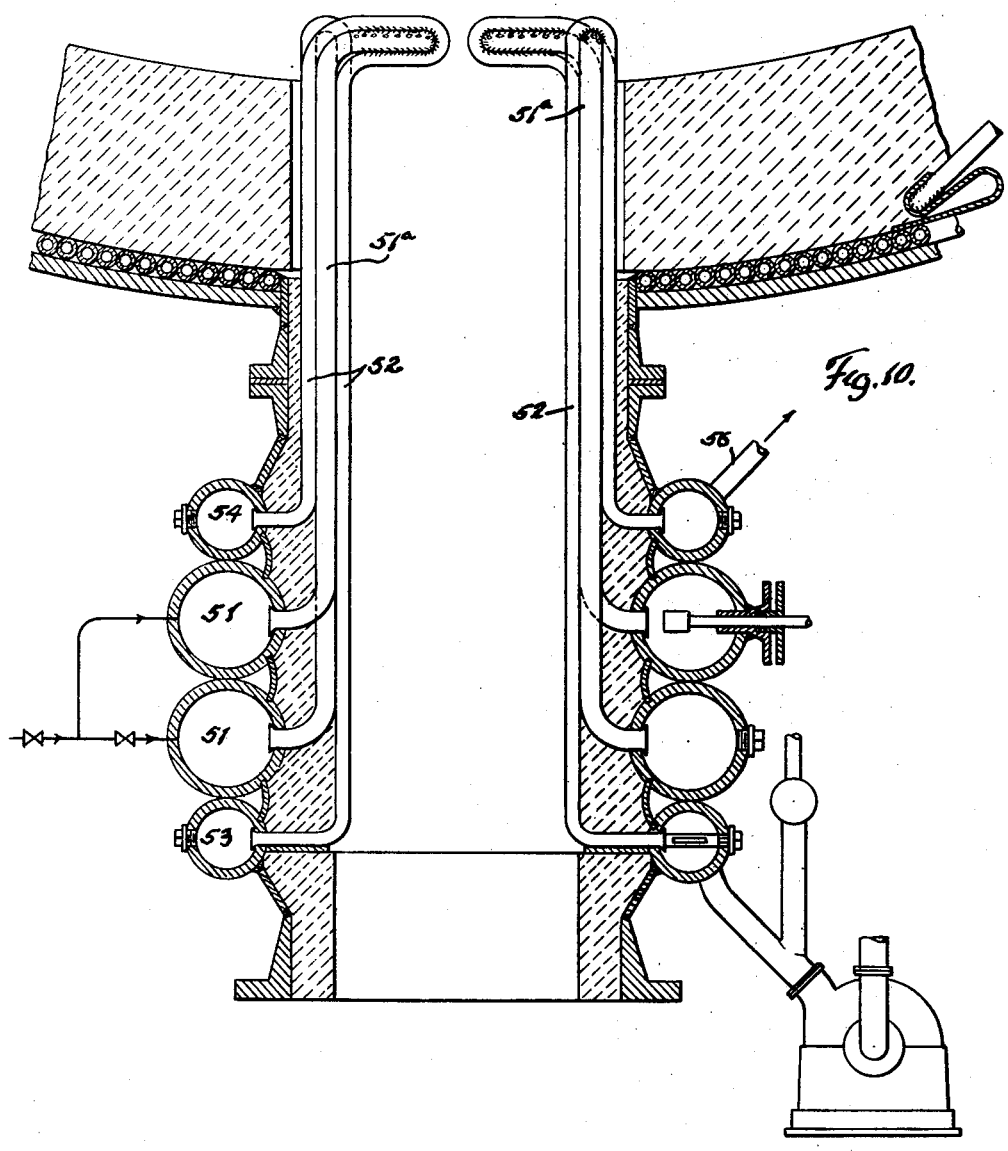

Figs. 6, 7 and 8 are respectively sectional views taken on the line 6—6, 7—7 and 8—8 of Fig. 5;

Fig. 9 is an enlarged section taken on the line 9—9 of Fig. 1;

Fig. 10 is an enlarged section through the burner; and

Figure 11:
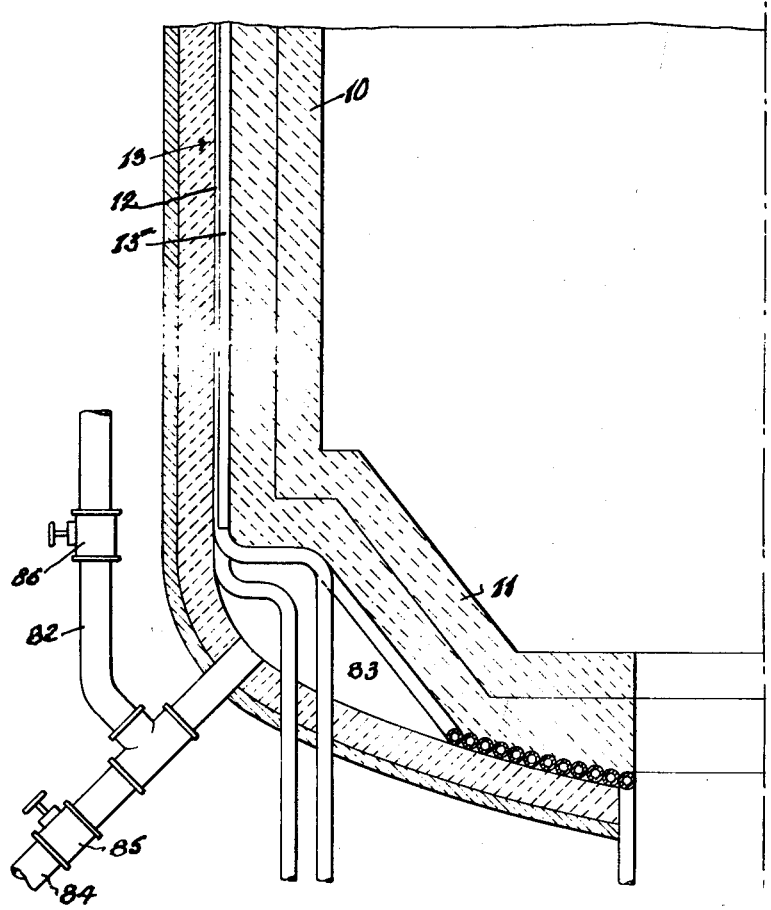

Fig. 11 is a view corresponding to Fig. 4, but illustrating a modification.

Referring now to Fig. 1, the generator is indicated as a whole by the reference character A and the burner for introducing the fuel by the reference character B, the burner in this case being water-cooled and particularly suitable for introducing natural gas and preheated oxygen. This burner is shown and described and claimed in my copending application Serial No. 763,343, of which this application is a continuation-in-part. The aforesaid application is incorporated herein by reference thereto.

In the main, the generator comprises a furnace of synthesis gas generating section proper 7, a cooling section 8, the synthesis gas collecting section or dome 9, and the steam generating parts hereinafter to be described. The portions 7 and 8 of the generator have an external metal casing 10 which is cylindrical and made up of cylindrical lengths, welded together. The furnace portion 7 is of enlarged diameter and communicates with the section 8 through the tapered throat portion 7'. The furnace and the throat portion are lined with refractory material 11 between which and the casing 10 is a tubular water wall 12 to be hereinafter described, this water wall extending upwardly through the section 8 of reduced diameter approximately to the joint C between section 8 and the gas collecting chamber or dome 9. Insulating material 13 is provided between the water wall and the casing 10.

Within the cooling section 8 is a bundle of returned bent tubes 14 suspended at their upper ends from the header means located in the dome 9 in a manner to be hereinafter described. The tube bundle is generally circular in cross section and cross sectionally substantially fills the section 8, save for the necessary spaces between the tubes of the bundle and between the bundle and the tubular water wall 12. The bundle of tubes 14 extends downwardly to a point somewhat above the top of the throat 7'. The hot synthesis gas leaving the furnace proper 7, in passing upwardly through the section 8 to the dome 9, is cooled by the tubes of the bundle and by the exposed tubes of the water wall 12 lining the section 8, and shrinks in volume. To maintain proper velocity, the section 8 is of reduced diameter relative to the furnace 7. The heat transfer surface within the section 8 is sufficient to lower the temperature of the gases so that the gases leaving the dome 9 through the pipes 16 leading to the reactor (not shown) are at a temperature which can be safely withstood by the dome and the pipes 16, say, for example, 600° F. To protect the lower ends of the tube bundle from the radiant heat of the furnace, certain of the tubes of the bundle are extended downwardly and carry a horizontal refractory baffle 17 located just above the mouth of the throat. To prevent "laning," baffles 37 may be provided in the bundle.

As will further appear, the bundle of tubes 14 constitutes a structural unit with the dome 9 so that the dome and the bundle can be handled together for insertion and removal of the bundle from the section 8. To this end the section 8 is provided with a flange 18 and the bottom of the dome with a corresponding flange 19. When the dome 9 and its bundle are positioned with respect to the section 8 and the flanges are secured together, the joint between section 8 and the dome is preferably closed by a seal weld 20. For purposes of inspection and repair of the interior of the furnace 7 and the section 8 or for purposes of inspection and repair of the tube bundle, this seal joint is cut and the dome 9 with its tube bundle lifted. For this purpose, all external parts associated with the dome are provided with joints which may be broken, such, for example, as the joints 21 for the pipes 16.

Referring now to the water wall 12, this is preferably composed of a plurality of tube units D, such as shown in Figs. 5 to 8. Each unit consists of a tube one end of which rises from a doughnut-shaped downcomer or supply header 23 surrounding the burner, to the point marked 80 when it is rebent and passed downwardly closely along itself and then inwardly to the point marked 81, from which point it is rebent on itself to pass upwardly to point 80, where it bends inwardly to conform with the throat 7' and then upwardly through the section 8 to a point approximately adjacent the point C where it is rebent on itself to pass downwardly for eventual connection to the upcomer or delivery header 24, which likewise is doughnut-shaped and surrounds the burner B.

Due to the looping described, each tube has four lengths in the furnace proper and two lengths in the throat and two lengths in the section 8. By the looping arrangement shown and described a large portion of the length of the tube, on its inlet pass, is between the lining and the casing where little if any steam is generated. Thus the initial resistance is such that a long length of single tube can be employed without difficulty.

It will be understood that the wall is made up of a plurality of these units arranged in an annulus. Within the generator and cooling section, the spaces between tube units and the spaces between the tube lengths of each unit are closed, either by welding 25 as shown in Figs. 6 and 8, where the spacing is fairly close, or by fins 26 welded to the tubes and to one another as shown in Fig. 7, where the space is slightly greater. Thus, a continuous annular gas-tight water cooled wall is formed in both furnace 7 and cooling section 8. This water cooled wall protects the metal casing not only from high temperature but also from contact with the hot generated gas until it has been cooled to a safe temperature. In this connection, the pressures on the inside of the water wall and between the water wall and the casing will tend to almost equalize and there will be no flow of gas such as to bring about contact of gas with the casing. Any gas initially entrained in the space between water wall and casing will tend to relieve itself upwardly when pressure is decreased because the space between the water wall and the casing is not tightly closed at its upper end near the joint C.

The water wall, in addition to cooling the casing and protecting it from the hot gases, constitutes a strength element for the generator to the extent that sudden increases in pressure of small magnitude will be resisted by the water wall, the design being based on nearly balanced pressures on opposite sides of the water wall. Another advantage of lining the casing with the water cooling wall is that it is thereby made unnecessary to exteriorly lag the casing. In consequence, should there be a failure or break in the furnace lining and/or water wall, a hot spot will develop which can be readily seen and the installation shut down, thus avoiding the possibility of accident or serious damage. This condition could not be observed were the casing lagged exteriorly.

Still another advantage of providing the water wall is that in its absence, the wide variation in temperatures to which the casing would be subjected would introduce unequal expansion and stress difficulties, with the result that the casing would be likely to be ruptured with concomitant hazards. In this connection it will be observed that by employing water wall units of the type described the casing will be fairly uniformly cooled throughout its length, i.e., there will be no wide temperature variations throughout its length.

I prefer to employ tubes for the water wall of an outside diameter of about 1¼" to 1½". (The tubes of the tube bundle in the cooling section are preferably of the same diameter.)

Circulation for water wall tube units is afforded as follows: A downcomer or downcomers 27 leads or lead from the steam and water drum 28 to the forced circulation pump 29 through which water is supplied via pipe 30 to the strainer drum 31. From the strainer drum 31 water is led to the downcomer header 23 by means of downcomers 32. Upcomers 33 rise from the upcomer header 24 and connect with the steam and water drum. Thus there is forced circulation through the water wall. It will be understood that the boiler is provided with feed water in the customary manner (not shown).

Where the tubes of the units pass through the casing they are welded to the casing for purposes of gas tightness. For repair or replacement tube units may be removed through the top of section 8 or through the burner receiving opening upon removal of the burner.

In furtherance of the protection of the casing, a water admission tube or tubes 34 is or are led from header 23 into the casing and formed into a coil 34' between the casing and the lining 11 and surrounding the opening 35, which receives the end of the burner as shown in Fig. 4. This coil eventually empties into header 24. To prevent leakage to the exterior a seal 36 is provided for the coil and certain of the tubes of the coil are welded to one another and to the casing 10.

It has heretofore been pointed out that the tube bundle is supported from the dome to form a unit therewith. One way of doing this is shown in Figure 9.

On examination of this figure it will be seen that within the dome there are a plurality of headers 38 and 39, alternating with one another, the headers 38 being inlet headers or feeder headers, and the headers 39 being outlet or discharge headers. It will also be seen that the tubes of the bundle 14 are bifurcated and rebent on themselves. The inlet ends of the various tubes of the bundle are connected to respective inlet headers 38 and the outlet ends thereof are connected to respective outlet headers 39.

The inlet headers 38 are supended by means of downcomer or supply tubes 40 which pass through sleeves 41 welded to the wall of the dome 9, the tubes in turn being welded to the sleeves as shown. Similarly the outlet headers 39 are suspended from outlet upcomer or discharge tubes 42 which likewise pass through sleeves in the wall of the dome, the sleeves being welded to such wall and the tubes being welded to such sleeves. Thus the dome is gas-tight and the dome and tube bundle are made to constitute a structural unit.

The downcomer or inlet or supply tubes 40 connect to headers 43 of which there may be several, which are supplied by pipes 44 leading from the strainer drum 31. Breakable joints 45 are provided between pipes 44 and headers 43. Similarly the upcomer outlet or discharge tubes 42 connect with headers 46 which in turn have breakable joints 47 for connection with headers 48. These headers are connected by the tubes 49 to the steam and water drum 28.

Thus by breaking the joints, the dome and its tube bundle and other parts directly associated therewith, can be handled as a unit.

The headers 38 and 39 vary in length so as to fit within the circular dome. The dome may satisfactorily be made high enough so that a header may be up-ended therein for removal through the manhole 50 and replacement, and the diameter of the dome is such as to provide working space.

It is desirable wherever possible to use but a single burner and to preferably locate it in the center of the bottom of the furnace as this, among other things, makes the matter of sealing against leakage more simple; but when the fuels utilized contain ash some other location for the burner may prove more satisfactory.

Referring now to the burner B and Fig. 10, the preheated oxygen is delivered thereto through one or more doughnut-shaped headers 51 and pipes 51a, which latter are cooled by the pipes 52 which are supplied through downcomer header 53. The pipes 53 discharge into header 54 which is connected to header 24 by pipe 56. Thus, cooling pipes 52 are in the circulation of the boiler. The boiler is desirably operated at a pressure to give a temperature approximating that at which the oxygen is delivered, say, for example, at 500° F. when the oxygen is heated to 600° F.

To give some idea of the size of the generator and the heat exchange surfaces employed, the generator shown is about 70 feet in height and about 11 feet in outside diameter at the combustion chamber or furnace 7, and the generator is calculated to generate about 500,000 lbs. of steam per hour, more or less, as desired.

When the gas generator is operated at superatmospheric pressure such as for example 20 atmospheres, as is being used and has been used, any gas, such as air, entrapped between the water wall and the shell in the spaces 13a between insulation and water wall or in other interstices between tubes or within the insulating material will be compressed to $\frac{1}{20}$ its original volume and additional compressed gas will flow into such spaces and remain under pressure and compressed in volume so long as the pressure is maintained within the furnace and cooling sections of the generator. However should a sudden lowering of pressure take place within the operating process space of the vessel it is desirable to have the pressure between water wall and casing fall off at substantially the same rate. This requires provision for venting such pressured gas to the interior process space. This is accomplished in this invention in part by (a) maintaining a flush surface between insulation 13 and the back of the water walls thus providing lanes or vents between each pair of tubes; and in part by (b) providing a separate vent line 82 connected into the confined space 83 at one end and into the gas outlet lines 16 or the dome 9 at the other end.

For safety reasons it is also desirable to purge the space 83 and the spaces 13a with a non-combustible gas such as nitrogen or carbon-dioxide. This may be accomplished by admitting gas under pressure through line 84 after closing valve 86 and opening valve 85. Since the synthesis gas being generated is largely a mixture of the combustible gases carbon monoxide and hydrogen such purging is required before attempting any torch cutting or welding within the confines of the gas generator after it has been in operation.

The generator is simple and effective, will withstand severe operating conditions, have long life, and is capable of ease of installing and repair. The furnace and cooling section and water wall may be handled as a unit. Assembly of the dome and tube bundle as a unit and of the furnace cooling section and water wall as a unit may be in the field or in the shop.

This application is a continuation-in-part of my copending application Serial No. 763,343, filed July 24, 1947. Reference is also made to my copending application Serial No. 767,550, filed August 8, 1947, and Serial No. 783,108, filed October 30, 1947, now Patent No. 2,601,001, respectively generally directed to the gas collecting dome and related features and to a construction in which the gases generated flow between the water wall and the casing to their outlet.

I claim:

1. Apparatus for containing a high pressure exothermic synthesis-gas generating reaction and for extracting waste heat therefrom, comprising a gas-tight metal pressure casing defining a high temperature reaction section and a cooling section adjacent thereto, a refractory lining for the reaction section, a substantially gas tight tubular water wall interposed between the lining and the casing and extending along the latter into the cooling section to define the gas conducting space thereof, a steam and water drum, means for connecting the water wall with the drum for circulation, a bundle of tubes in the cooling section exposed to the flow of gas therein, means for connecting the bundle with the drum for circulation, and a burner for introducing fuel to the reaction section.

2. Apparatus for containing a high pressure exothermic synthesis-gas generating reaction and for extracting waste heat therefrom, comprising an exteriorly unlagged gas-tight metal pressure casing defining a high temperature reaction section and a cooling section adjacent thereto, a refractory lining for the reaction section, a substantially gas tight tubular water wall interposed between the lining and the casing and extending along the latter into the cooling section to define the gas conducting space thereof, a steam and water drum, means for connecting the water wall with the drum for circulation, a bundle of tubes in the cooling section exposed to the flow of gas therein, means for connecting the bundle with the drum for circulation, and a burner for introducing fuel to the reaction section.

3. The apparatus of claim 2, in which the cooling section has a diameter substantially less than the diameter of the reaction section and in which the bundle of tubes has a cross sectional area almost as large as that of the interior of the cooling section.

4. The apparatus of claim 2 in which a gas-tight seal is provided between the casing and lining near to and surrounding the burner to prevent hot gas from around the burner from coming in contact with the casing.

5. The apparatus of claim 2, in which the water wall is composed of closely spaced units of adjacent tube lengths rebent on themselves and provided with closure members in the spaces therebetween welded thereto to complete the wall.

6. The apparatus of claim 2, in which the reaction section is substantially greater in diameter than the cooling section and in which the water wall is composed of closely spaced units of adjacent tube lengths rebent on themselves, with the tube lengths in the reaction section greater in number than the tube lengths in the cooling section.

7. The apparatus of claim 2, in which the reaction section and gas section are vertically serially arranged and the reaction section is provided with an opening in its bottom to receive the free end of the burner and in which the burner is detachably secured whereby said opening may be utilized for the removal of a bundle tube.

8. The apparatus of claim 2, in which the burner is provided with oxygen tubes and has a portion extending exteriorly of the casing which is provided with headers for supplying the tubular water wall and for supplying the bundle of tubes, said headers for supplying the bundle of tubes being connected in the circulation of the drum.

9. The apparatus of claim 2, in which the interior space within the water wall communicates with the space between the water wall and the casing at one end whereby pressures in said spaces tend to balance.

10. The apparatus of claim 2, in which the interior space within the water wall communicates with the space between the water wall and the casing at one end whereby pressures in said spaces tend to balance, and in which the casing is provided with a vent leading from the space between the casing and the water wall to the exterior for the purging of gases in such space.

WARD S. PATTERSON.

REFERENCES CITED

The following references are of record in the file of this patent:

UNITED STATES PATENTS

| Number | Name | Date |
| --- | --- | --- |
| 505,759 | Fehrenbatch | Sept. 26, 1893 |
| 564,512 | Fehrenbatch | July 21, 1896 |
| 745,635 | Lummis | Dec. 1, 1903 |
| 1,794,802 | Spyer | Mar. 3, 1931 |
| 1,812,080 | Chapman | June 30, 1931 |
| 1,827,244 | La Mont | Oct. 13, 1931 |
| 1,858,834 | Lucke | May 17, 1932 |
| 1,866,399 | DeBaufre | July 5, 1932 |
| 1,874,527 | Herpen | Aug. 30, 1932 |
| 1,966,610 | Chilowsky | July 17, 1934 |
| 2,007,540 | La Mont | July 9, 1935 |
| 2,258,467 | Owens | Oct. 7, 1941 |
| 2,319,399 | Hamm | May 18, 1943 |

OTHER REFERENCES

Ser. No. 303,852, Szigetti (A. P. C.), published Apr. 27, 1943.